US012424151B2

(12) United States Patent
Xu et al.

(10) Patent No.: US 12,424,151 B2
(45) Date of Patent: Sep. 23, 2025

(54) LIGHT-EMITTING DIODE (LED) BACKLIGHT CONTROL SYSTEM ENHANCING STABILITY AND REDUCING POWER CONSUMPTION

(71) Applicant: Beijing Zitiao Network Technology Co., Ltd., Beijing (CN)

(72) Inventors: Lintao Xu, Beijing (CN); Jiu Xia, Beijing (CN); Kaiyang Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/665,154

(22) Filed: May 15, 2024

(65) Prior Publication Data

US 2024/0386839 A1 Nov. 21, 2024

(51) Int. Cl.
*G09G 3/32* (2016.01)

(52) U.S. Cl.
CPC ........... *G09G 3/32* (2013.01); *G09G 2310/08* (2013.01); *G09G 2330/023* (2013.01); *G09G 2360/08* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 3/34; G09G 3/3406
USPC ...................................................... 345/76–83
See application file for complete search history.

(56) References Cited

U.S. PATENT DOCUMENTS

2004/0027320 A1* 2/2004 Ochi .................... G09G 3/3283 345/84
2007/0296353 A1* 12/2007 Ito ......................... H02M 3/156 361/837
2008/0088257 A1* 4/2008 Zhou .................. H05B 41/3927 361/91.1
2008/0094008 A1* 4/2008 Liu ........................ H05B 45/46 315/294
2009/0102399 A1* 4/2009 Kita ....................... H05B 45/50 315/307
2010/0289425 A1* 11/2010 Huang ................. G09G 3/3406 315/250

(Continued)

*Primary Examiner* — Ke Xiao
*Assistant Examiner* — Nelson Lam

(57) ABSTRACT

A backlight control system, a control method, and a related device are provided. The backlight control system includes: a power conversion unit, configured to convert an input electrical signal into an output voltage to drive a light source; an acquisition unit, configured to acquire a cathode voltage of the light source at a timing of a completion of light source illumination; and a processing unit, connected to the acquisition unit and configured to determine feedback information used to adjust the output voltage based on a preset voltage and the cathode voltage. The cathode voltage of the light source is acquired by the acquisition unit. The processing unit determines the feedback information used to adjust the output voltage based on the preset voltage and the cathode voltage. The feedback information is beneficial for balancing backlight stability and power consumption, thereby enhancing system stability while reducing power consumption of the system.

14 Claims, 5 Drawing Sheets

(56) References Cited

U.S. PATENT DOCUMENTS

| | | | | |
|---|---|---|---|---|
| 2012/0075544 | A1* | 3/2012 | Sasaki .................... | H05B 45/10<br>315/127 |
| 2013/0113841 | A1* | 5/2013 | Choi ...................... | H05B 45/18<br>345/82 |

* cited by examiner

100

LIGHT-EMITTING DIODE (LED) BACKLIGHT CONTROL SYSTEM ENHANCING STABILITY AND REDUCING POWER CONSUMPTION

CROSS-REFERENCE TO RELATED APPLICATION(S)

This application claims priority to Chinese Application No. 202310545518.2 filed May 15, 2023, the present disclosure of which is incorporated herein by reference in its entity.

FIELD

The present disclosure relates to the technical field of display, and in particular, to a backlight control system, a control method, and a related device.

BACKGROUND

Extended reality (XR) refers to a combination of reality and virtuality through computers to create a virtual environment of human-computer interaction, which is also a general term for various technologies, such as augmented reality (AR), virtual reality (VR), and mix reality (MR).

In view of optical display effects and user experience, currently, screen brightness adjustment on extended reality (XR) products is performed basically through low-frequency pulse width modulation (PWM) dimming. Moreover, due to the characteristics of a low proportion of screen-on time and high brightness, power consumption of a backlight remains at a high level.

SUMMARY

In view of this, an objective of the present disclosure is to provide a backlight control system, a control method, and a related device.

Based on the above objective, in a first aspect, an embodiment of the present disclosure provides a backlight control system, including:

- a power conversion unit, configured to convert an input electrical signal into an output voltage for driving a light source;
- an acquisition unit, configured to acquire a cathode voltage of the light source at a timing of a completion of light source illumination; and
- a processing unit, connected to the acquisition unit and configured to determine feedback information used to adjust the output voltage based on a preset voltage and the cathode voltage.

In a second aspect, an embodiment of the present disclosure provides a control method for a power conversion unit, applied to a backlight control system, including:

- in response to a completion of illumination of a light source of the backlight system, acquiring a cathode voltage of the light source; and
- determining feedback information used to adjust an output voltage of the power conversion unit based on the preset voltage and the cathode voltage, wherein the output voltage is used to drive the light source.

In a third aspect, an embodiment of the present disclosure provides an electronic device, including a memory, a processor, and a computer program stored on the memory and running on the processor. When the processor executes the program, the control method according to the second aspect is implemented.

In a fourth aspect, an embodiment of the present disclosure provides a non-transitory computer-readable storage medium, storing computer instructions. The computer instructions are configured to enable a computer to perform the control method according to the second aspect.

In a fifth aspect, an embodiment of the present disclosure provides a computer program product, including computer program instructions. The computer program instructions, when running on a computer, enable the computer to perform the control method according to the second aspect.

From the above description, it may be seen that based on the backlight control system, the control method, and the related device provided by the present disclosure, the cathode voltage of the light source is acquired by the acquisition unit; and the processing unit determines the feedback information used to adjust the output voltage based on the preset voltage and the cathode voltage, and the feedback information is beneficial for balancing backlight stability and power consumption, thereby enhancing system stability while reducing power consumption of the system.

BRIEF DESCRIPTION OF THE DRAWINGS

In order to describe the technical solutions of the present disclosure or the related art more clearly, the accompanying drawings required for describing embodiments or the related art will be briefly introduced below. Apparently, the accompanying drawings in the following description are merely embodiments of the present disclosure, and those of ordinary skill in the art may also obtain other accompanying drawings according to these accompanying drawings without creative efforts.

DETAILED DESCRIPTION OF EMBODIMENTS

To have a clearer understanding of objectives, technical solutions, and advantages of the present disclosure, the present disclosure is further described in detail in conjunction with specific embodiments and with reference to the accompanying drawings below.

It should be noted that unless otherwise defined, the technical or scientific terms used in the embodiments of the present disclosure should have ordinary meanings understood by those of ordinary skill in the art of the present disclosure. Similar words such as “first” and “second” used in the embodiments of the present disclosure are merely used for distinguishing different components instead of representing any sequence, quantity, or importance. Similar words such as “comprise” or “include” are intended to indicate that elements or objects appearing in front of the word cover elements or objects listed behind the word, as well as equivalents without excluding other elements or objects. Similar words such as “connected” or “coupled” are not limited to physical or mechanical connections, but may include electrical connections, regardless of direct connections or indirect connections. Words such as “above”, “below”, “left”, “right”, etc. are merely used for representing a relative positional relationship, and when the absolute position of a described object changes, the relative positional relationship may correspondingly change.

As mentioned in the section of background, extended reality (XR) technology refers to generating a human-computer interaction environment that combines reality and virtuality through the computer technology and a wearable device. Extended reality (XR) technology has been gradually applied to lives of people and various related technical fields, such as shopping, gaming, entertainment, sports and fitness, etc.

Figure 1:
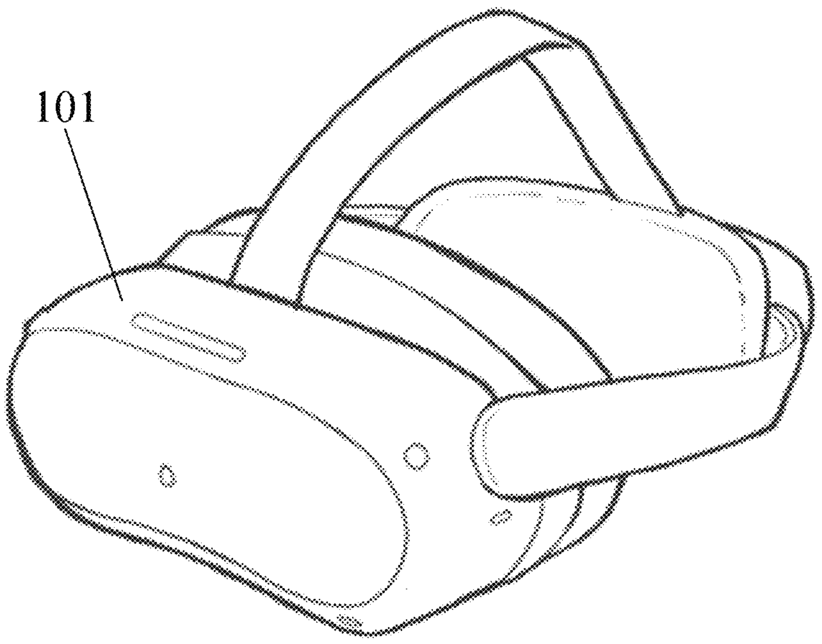
FIG. 1 is a schematic diagram of an extended reality device according to an exemplary embodiment of the present disclosure.

FIG. 1 illustrates a virtual reality device 100. The VR device is a computer simulation device that may create and experience a virtual world. The VR device may utilize computer programs to generate a simulated environment, and provide a multi-source information fusion, interactive three-dimensional dynamic visual and physical behavior simulation, allowing users to immerse in a virtual environment. The VR device typically covers the eyes of the user, creating a black box state, with a display screen 101 located in front of the eyes, and usually has low light transmittance.

When using an extended reality product, for the purposes of optical display effects and user experiences, current screen brightness adjustment of the device is performed basically through low-frequency PWM dimming. The proportion of screen-on time is very low, basically less than 10%. In addition, because the light transmittance of a display screen of the device is usually relatively low (e.g., the VR device 100 shown in FIG. 1), the screen brightness needs to be very high, making backlight current of the screen relatively large, which ultimately results in a high power consumption of backlight.

Figure 2:
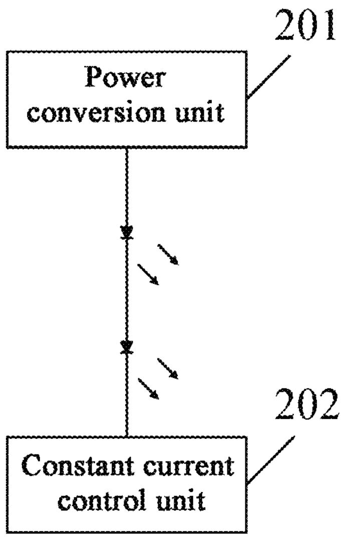
FIG. 2 is a partial structural schematic diagram of a backlight control system for PWM dimming according to an exemplary embodiment of the present disclosure.

FIG. 2 illustrates a partial structural schematic diagram of a backlight control system according to an exemplary embodiment of the present disclosure. Due to the short screen-on time and high current, using an LED driver as a backlight power supply is not good in use effect. A power conversion unit 201 (e.g., a Boost chip) is basically used for the current power supply of a backlight to provide a stable high voltage for a light-emitting diode (LED), and a constant current control unit 202 is connected following the LED to implement LED driving and current stabilization. Meanwhile, the internal temperature of the extended reality device varies, and the heat dissipation conditions at different times are also different, making the operating temperature of the display screen vary with the environment and working conditions. The LED luminous efficiency and forward voltage drop are not consistent at different temperatures. To ensure that the LED may still emit light normally in the harshest working environment, an output voltage of the Boost chip may exceed the normal operating voltage to leave a large margin for the harsh working environment. However, the voltage margin exceeding the normal operating voltage causes a waste of power consumption when the extended reality device operates in a normal condition.

Figure 3:
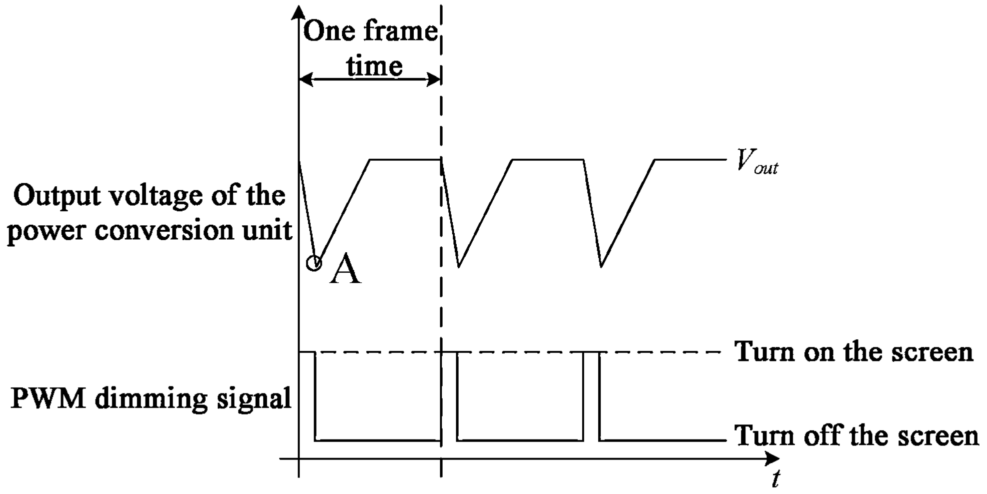
FIG. 3 is a schematic diagram of a signal waveform in FIG. 2.

FIG. 3 is a schematic diagram of a signal waveform in FIG. 2. In theory, an output voltage $V_{out}$ of the Boost chip is stable. In practice, the fluctuation range of the output voltage $V_{out}$ is relatively large in a backlight illumination cycle. As shown in FIG. 3, with a change of a PWM dimming signal, during the process of LED illumination, the output voltage $V_{out}$ shows a gradual downward trend. After the LED is turned off, the output voltage $V_{out}$ gradually rises until recovering to an original set voltage. Therefore, there is a minimum value for the output voltage $V_{out}$. That is, the output voltage $V_{out}$ of the Boost chip at a completion timing of backlight illumination that is corresponding to the ellipse A in FIG. 3 is minimum.

The inventors of the present disclosure have noticed that the voltage drop caused by the backlight power supply through the LED varies with the operating temperature of the LED. Additionally, there is a consistency problem for the LED. It is difficult to ensure the normal and economical illumination of all screens through the control of the output voltage $V_{out}$. However, the voltage drop between a LED cathode and ground (i.e., the voltage drop across a transistor and a resistance to ground, referring to FIG. 6 and FIG. 7) remains consistent when the current is constant. Therefore, it is more economical to use a cathode voltage (i.e., the voltage entering the constant current control unit) at the completion timing of LED illumination as a final control target, rather than using the output voltage $V_{out}$ of the Boost chip as the control target. It should be noted that the output voltage $V_{out}$ of the Boost chip is minimum when the LED is fully illuminated. If the output voltage $V_{out}$ at this time may meet the requirement, the output voltage at other times may still meet the requirement.

Therefore, the cathode voltage at the completion timing of LED illumination is collected as a feedback signal for the output voltage $V_{out}$ of the Boost chip, ensuring that the cathode voltage (i.e., the voltage entering a constant current source) obtained after the output voltage $V_{out}$ of the Boost chip passes through the LED satisfies the voltage drop of the constant current control unit, so as to guarantee stable luminescence of the LED under a constant current.

In view of this, the present disclosure provides a backlight control system, a control method, and a related device. A cathode voltage of a light source is acquired through an acquisition unit. A processing unit determines, based on a preset voltage and the cathode voltage, feedback information used to adjust the output voltage. The feedback information is beneficial for balancing backlight stability and power consumption, thereby enhancing system stability while reducing power consumption of the system.

Figure 4:
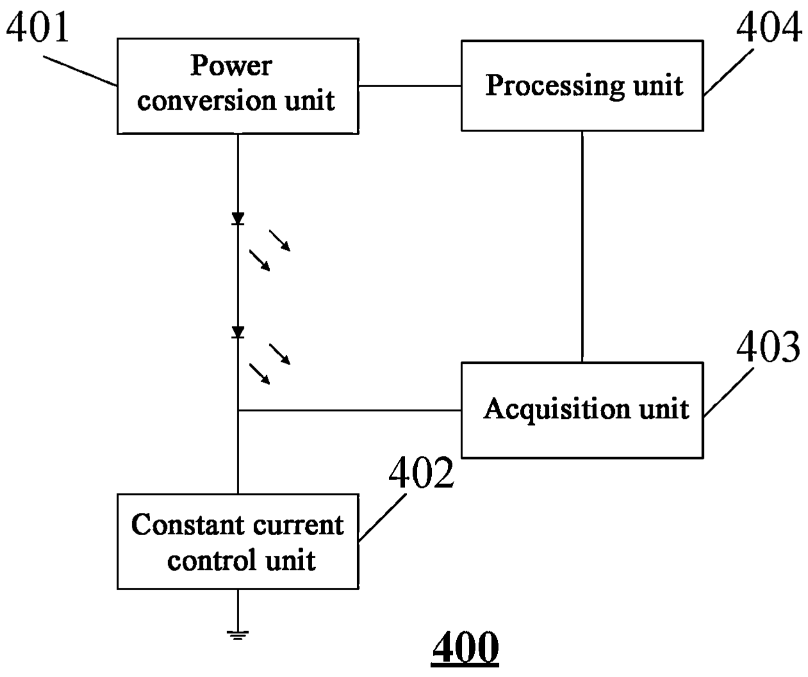
FIG. 4 is a structural schematic diagram of a backlight control system according to an exemplary embodiment of the present disclosure.
Figure 6:
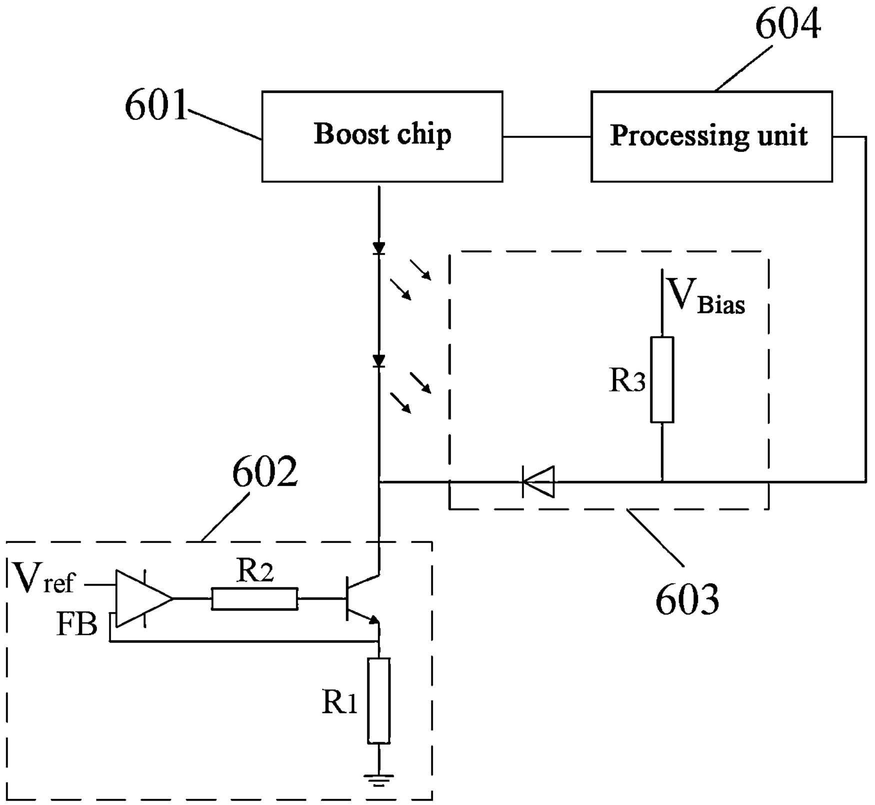
FIG. 6 is a structural schematic diagram of another backlight control system according to an exemplary embodiment of the present disclosure.
Figure 7:
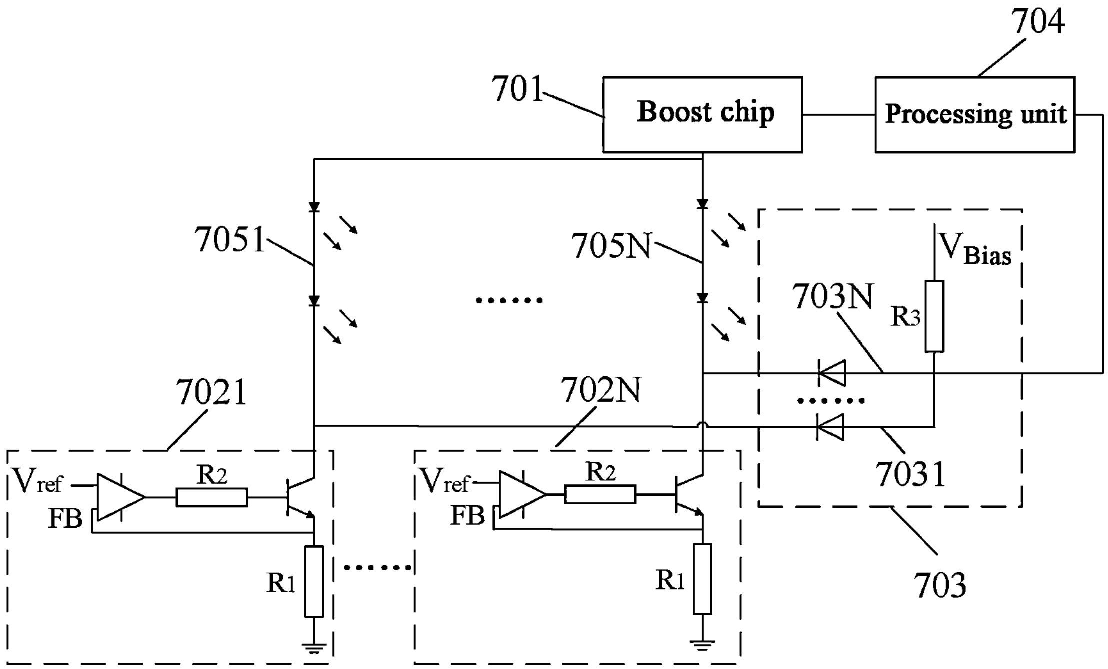
FIG. 7 is a schematic diagram of yet another backlight control system according to an exemplary embodiment of the present disclosure.

FIG. 4 illustrates a structural schematic diagram of a backlight control system 400 according to an exemplary embodiment of the present disclosure. FIG. 6 illustrates a structural schematic diagram of another backlight control system according to an exemplary embodiment of the present disclosure. FIG. 7 illustrates a structural schematic diagram of yet another backlight control system according to an exemplary embodiment of the present disclosure. The backlight control system may include: a power conversion unit 401, 601, and 701; a constant current control unit 402, 602, 7021, and 702N; an acquisition unit 403, 603, and 703;

and a processing unit 404, 604, and 704. A cathode voltage of a light source is acquired through an acquisition unit. The processing units determine, based on a preset voltage and the cathode voltage, feedback information used to adjust an output voltage. The feedback information is beneficial for balancing backlight stability and power consumption, thereby enhancing system stability while reducing power consumption of the system.

Optionally, the light source is selected from LEDs.

Taking the light source being the LED as an example, the backlight control system is described in detail as below. Referring to FIG. 7, an LED backlight may include at least one channel of LEDs, such as a first channel LED 7051 . . . an Nth channel LED 705N. Further, each channel of LEDs may include at least one LED or may be formed by connecting a plurality of LEDs in series. Each channel of LEDs has two LEDs as shown in FIG. 4, FIG. 6, and FIG. 7.

It should be noted that an LED cathode mentioned below refers to a cathode of each channel of LEDs, i.e., the cathode of the last LED in a channel of LEDs.

In some embodiments, the LED backlight control system 400 specifically includes:

a power conversion unit 401, 601, and 701 for converting an input electrical signal into an output voltage for driving the LED. Optionally, the power conversion unit 401, 601, and 701 is a voltage stabilizing output device, such as Boost chips. Here, the Boost chip stabilizes the voltage output through voltage feedback.

The constant current control unit 402, 602, 7021, and 702N is connected between the LED and ground for performing constant current control on the LED.

Exemplarily, as shown in FIG. 6 and FIG. 7, each of the constant current control units 602, 7021, and 702N includes:

a transistor, wherein a collector of the transistor is connected to the cathode of the LED, and optionally, the transistor may be replaced with a metal-oxide-semiconductor field-effect transistor (MOSFET);

a first resistor R1, where an emitter of the transistor is connected to ground via the first resistor R1;

an amplifier, where an input terminal of the amplifier is used to receive a reference voltage $V_{ref}$, another input terminal of the amplifier is connected to the emitter of the transistor, and an output terminal of the amplifier is connected to a base of the transistor; and a second resistor R2, that is connected between the output terminal of the amplifier and the base of the transistor.

It should be noted that a PWM dimming signal may act on a power supply terminal of the amplifier to control conduction and cutoff of the transistor. When the transistor is cut off, the LED is turned off. When the transistor is conducted, the LED is illuminated with a constant current.

Optionally, the processing unit 404, 604, and 704 is connected with a constant current control unit. The PWM dimming signal may be sent by the processing unit 404, 604, and 704. A connection relationship between the processing unit and the constant current control unit is not shown in the figure.

Those skilled in the art may set a resistance of the R1 based on a set current of the LED and a reference voltage, and the present disclosure does not limit on this.

As shown in FIG. 7, if the LED backlight includes a plurality of channels of LEDs, each channel of LEDs corresponds to a constant current control unit. For example, the LED 7051 corresponds to the constant current control unit 7021 . . . the LED 705N corresponds to the constant current control unit 702N. That is, a separate constant current control unit is set for each channel of LEDs for control.

The acquisition unit 403, 603, and 703 is configured to acquire the LED cathode voltage when the LED is fully illuminated.

For example, an embodiment of the present disclosure further provides a specific structure of an acquisition unit. Referring to FIG. 6 and FIG. 7, the acquisition unit specifically includes:

a diode, wherein a cathode of the diode is connected to the cathode of the LED, and an anode of the diode is connected to the processing unit 604 and 704; and a bias module connected to the anode of the diode.

Optionally, the bias module includes a third resistor R3, a terminal of the third resistor R3 is connected to the anode of the diode, and another terminal is used to receive a bias voltage $V_{bias}$.

By setting the bias voltage and in combination with the diode, it may be ensured that the diode may conduct only when the LED cathode voltage is less than the bias voltage, and the impact on the normal illumination of the LED may be reduced while ensuring the acquisition of the cathode voltage.

Optionally, the bias voltage is greater than the preset voltage. It should be noted that the bias voltage directly affects a detection range of the LED cathode voltage. If the bias voltage is less than the preset voltage, and the LED cathode voltage is often greater than the preset voltage, the LED cathode voltage may not be effectively acquired.

Here, the preset voltage is determined based on the voltage drop across the transistor and the first resistor under a constant current condition (a current during illumination of the LED). Optionally, the preset voltage is slightly greater than the voltage drop across the transistor and the first resistor under a constant current condition. For example, the preset voltage may be the product of the voltage drop across the transistor and the first resistor under the constant current condition and a preset first coefficient (e.g., 1.05, 1.1). Alternatively, the preset voltage may be the sum of the voltage drop across the transistor and the first resistor under the constant current condition and a first correction voltage (e.g., 0.1 V and 0.2 V). Here, the preset first coefficient and the first correction voltage are used for ensuring that the preset voltage is slightly greater than the voltage drop across the transistor and the first resistor under the constant current condition, leaving a margin to ensure that the LED may be illuminated normally.

It should be understood that the bias voltage needs to cover a fluctuation range of the LED cathode voltage when the backlight is fully illuminated while being greater than the preset voltage and should not be too large, thereby avoiding the impact of a bias current generated by the bias voltage on the normal illumination of the LED.

To further reduce the interference of the bias current, a resistance value of the third resistor is 0.09 MΩ to 1.1 MΩ, such as 90 MΩ, 100 MΩ, 1.0 MΩ, and 1.1 MΩ. By setting the resistance value of the third resistor in the range of 0.09 MΩ to 1.1 MΩ, the bias current may be effectively reduced, thereby ensuring implementation of detecting the LED cathode voltage while reducing the impact of the bias current on the normal illumination of the LED.

In combination with the foregoing, there are a plurality of LEDs forming at least two channels, and therefore the number of the diodes corresponds to the number of the channels of the LEDs. As shown in FIG. 7, the LED 7051 corresponds to a diode 7031 . . . the LED 705N corresponds to a diode 703N. Meanwhile, the bias module is connected to anodes of respective diodes. In other words, for the plurality of channels of LEDs, each channel is provided with a diode. The plurality of channels of LEDs share the common bias module.

With this configuration, the voltage drop across each diode is the same. When LED cathode voltages in different channels are not exactly the same, the bias current preferentially flows into the constant current control unit corresponding to the channel with the lowest LED cathode voltage, thereby obtaining the minimum cathode voltage from the plurality of channels of LEDs.

Those skilled in the art should understand that if the minimum cathode voltage from the plurality of channels of LEDs meets a preset voltage requirement, it indicates that all other channels meet the preset voltage requirement.

Optionally, each of the acquisition units 403, 603, and 703 may further include a signal conversion module (not shown in the figures), such as an analog-to-digital converter (ADC). The signal conversion module may convert an analog cathode voltage signal into a digital discrete signal for subsequent processing by the processing unit.

The processing unit 404, 604, and 704 is connected to the acquisition unit 403, 603, and 703, and is configured to determine feedback information used to adjust the output voltage based on a preset voltage and the cathode voltage.

Optionally, the processing unit 404, 604, and 704 may be a microcontroller unit (MCU).

A cathode voltage at the time of completion of LED illumination is acquired by the acquisition unit. The processing units determine, based on a preset voltage and the cathode voltage, feedback information used to adjust the output voltage. The feedback information is beneficial for balancing backlight stability and power consumption, thereby enhancing system stability while reducing power consumption of the system.

Optionally, the processing unit 404, 604, and 704 may directly adjust the power conversion unit 401, 601, and 701 based on the feedback information (as shown in FIG. 4, FIG. 6, and FIG. 7), and may send the feedback information to another control device (not shown in the figure), and the another control device may adjust the output voltage of the power conversion unit 401, 601, and 701. The present disclosure does not impose limitations on this.

In some embodiments, the processing unit 404, 604, and 704 may also be configured to:

- include information indicating reducing an amplitude of the output voltage in the feedback information, in response to a difference between the cathode voltage and the preset voltage being greater than zero. It should be noted that the cathode voltage being greater than the preset voltage indicates that there is a large margin in the output voltage, resulting in wasted power consumption. Therefore, the waste of power consumption may be reduced by reducing the output voltage.

Figure 5A:
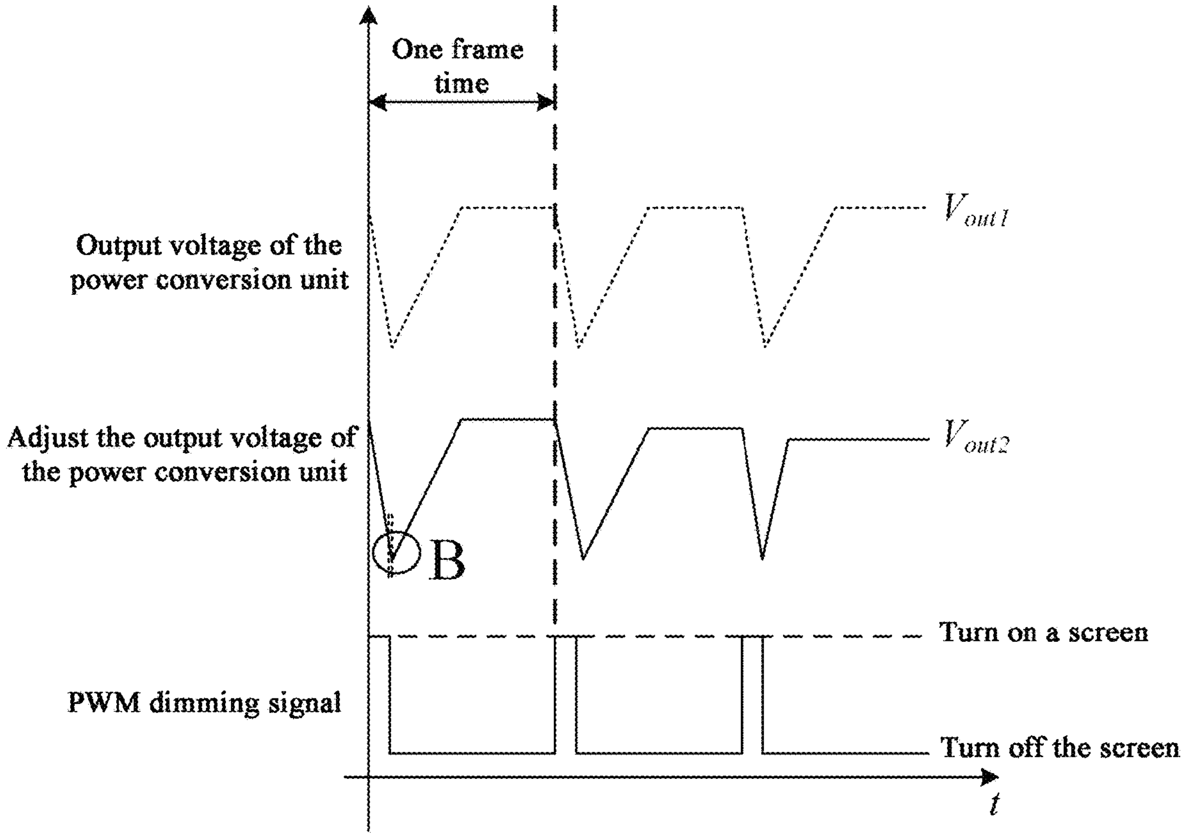
FIG. 5A is a schematic diagram of a signal waveform in FIG. 4.

FIG. 5A illustrates a schematic diagram of a signal waveform in FIG. 4. Those skilled in the art should understand that, for signal waveforms of the control systems in FIG. 6 and FIG. 7, reference may also be made to the waveform in FIG. 5A.

For ease of observation, FIG. 5A simultaneously shows a PWM dimming signal, an output voltage $V_{out1}$ of the power conversion unit not being adjusted, and an output voltage $V_{out2}$ of the adjusted power conversion unit. From FIG. 5A, it is apparent that after adjustment, in the case that the minimum value of the output voltage $V_{out2}$ of the power conversion unit satisfies the cathode voltage requirement, the maximum value of the output voltage $V_{out2}$ gradually decreases, thereby reducing the overall power consumption of the backlight.

In response to a difference between the cathode voltage and the preset voltage being less than zero, the feedback information may include information indicating increasing the amplitude of the output voltage (not shown in FIG. 5A). Herein, the cathode voltage being less than the preset voltage indicates that the cathode voltage is close to the limit of the voltage drop across the constant current control unit. If the cathode voltage continues to decrease, the LED may not operate normally. Therefore, it is necessary to increase the output voltage to raise the cathode voltage, ensuring normal operation of the LED.

It should be noted that because the preset voltage is set based on the voltage drop of the constant current control unit (the transistor and the first resistor to the ground) relative to the ground, with some margin added, the LED may still operate normally when the cathode voltage is slightly lower than the preset voltage.

Those skilled in the art should understand that the margin of the preset voltage may be flexibly set as needed, which is not specifically limited in the present disclosure.

For ease of description, the above apparatus is respectively described with various modules divided according to functions. Of course, during implementing the present disclosure, the functions of the modules may be realized in a same one or more software and/or hardware.

The apparatus of the above embodiments may implement the corresponding control method in any one of the following embodiments, and has the corresponding beneficial effects of the method embodiments, which will not be repeated herein.

Based on the same inventive concept, corresponding to the apparatus of any one of the above embodiments, the present disclosure further provides a control method for the power conversion unit of the backlight control system.

Figure 8:
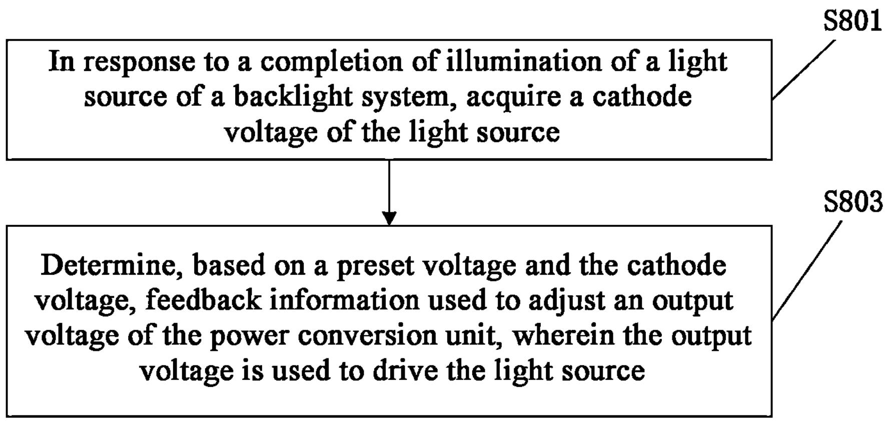
FIG. 8 is a schematic flowchart of a control method according to an exemplary embodiment of the present disclosure.

Referring to FIG. 8, the control method includes:

Step S801: in response to a completion of illumination of a light source of the backlight system, acquiring a cathode voltage of the light source. Those skilled in the art should understand that the completion of illumination of the light source refers to a final stage of a backlight illumination cycle, rather than a stage of a light source shutdown. In other words, during the stage of the light source shutdown, an output voltage $V_{out2}$ enters a rising stage (as shown in FIG. 5A), at this time, the light source is not conducted, and there is no light source cathode current.

Figure 5B:
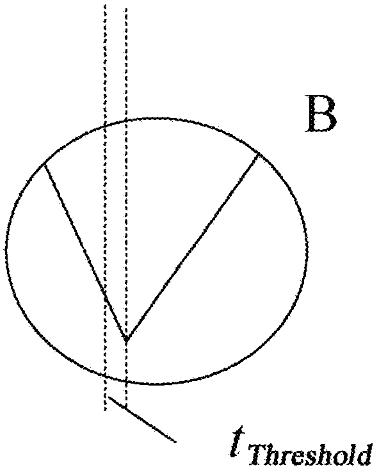
FIG. 5B is an enlarged view of a position B in FIG. 5A.

In some embodiments, referring to FIG. 5A and FIG. 5B, determining the completion of illumination of the light source of the backlight system specifically includes:

- acquiring a pulse width adjustment signal; and
- determining a time range for the completion of illumination of the light source based on a preset time threshold and the pulse width adjustment signal.

FIG. 5B illustrates an enlarged view of a position B in FIG. 5A. Combining FIG. 5A and FIG. 5B, it may be seen that the pulse width adjustment signal changes over time. Within the preset time threshold before the pulse width adjustment signal ceases to turn on the screen, the range may be considered as a time range for completion of LED illumination, corresponding to an area between two dashed lines in FIG. 5B. It should be noted that FIG. 5A only shows one position, but in fact, the cathode voltage may be obtained every time the screen is illuminated.

It should be noted that the preset time threshold may be flexibly set according to the actual design situation of the device, which is not specifically limited in the present disclosure.

Step S803: determining feedback information used to adjust the output voltage of the power conversion unit based on the preset voltage and the cathode voltage, wherein the output voltage is used to drive the light source, such as the LED.

According to the technical solution, the cathode voltage at a timing of a completion of light source illumination is acquired, the feedback information used to adjust the output voltage is determined based on the preset voltage and the cathode voltage, and the feedback information is beneficial for balancing backlight stability and power consumption, thereby enhancing system stability while reducing power consumption of the system.

In some embodiments, step S803 specifically includes:

calculating deviation information between the preset voltage and the cathode voltage, wherein the deviation information may be size information, difference information, proportion information, etc. The proportion information may be proportion information or proportion change information, etc., which is not specifically limited in the present disclosure.

It should be noted that a method for calculating deviation information may be preset according to adjustment needs.

The feedback information is determined based on the deviation information.

For example, the deviation information may be the proportion information, namely a ration of the cathode voltage to the present voltage (e.g., cathode voltage/preset voltage). If the ration of the cathode voltage to the present voltage is greater than 1, it indicates that the cathode voltage is relatively high, and there is a large margin in the output voltage. In this case, the feedback information may indicate lowering the output voltage; otherwise, the output voltage may be increased.

In addition, an adjustment amplitude of the output voltage in the feedback information may also be determined based on a related corresponding relationship according to a specific value of the proportion information. In other words, the relationship between the proportion information and 1 determines whether the output voltage should be decreased or increased, and the value of the proportion information determines the adjustment range of the output voltage.

In some embodiments, in response to the deviation information being the difference information, determining feedback information used to adjust the output voltage of the power conversion unit may include:

include information indicating reducing an amplitude of the output voltage in the feedback information, in response to a difference between the cathode voltage and the preset voltage being greater than zero; and include information indicating increasing the amplitude of the output voltage in the feedback information, in response to the difference between the cathode voltage and the preset voltage being less than zero.

It should be noted that the difference and the amplitude of the output voltage change may be equal or unequal, which is, for example, determined based on an electrical performance relationship. The present disclosure does not impose limitations on this.

It should be noted that the methods according to embodiments of the present disclosure may be applied to any backlight control system capable of implementing the functions, and are not limited to one or more embodiments disclosed in the present disclosure.

It should be noted that the methods according to embodiments of the present disclosure may be performed by a single device, such as a computer or server. The method according to embodiments of the present disclosure may also be applied to a distributed scenario that is implemented through cooperation of a plurality of devices. In the distributed scenario, one of the plurality of devices may only perform one or more steps of the methods according to embodiments of the present disclosure. The plurality of devices interact with each another to implement the method.

It should be noted that some embodiments of the present disclosure have been described above. Other embodiments are within the scope of the appended claims. In some cases, the actions or steps as claimed in the claims may be performed in an order different from that in the foregoing embodiments, and may still achieve desired results. In addition, the processes depicted in the accompanying drawings are not necessarily required to be shown in a particular or sequential order, to achieve desired results. In some implementations, multi-task processing and parallel processing are also possible or may be advantageous.

Based on the same inventive concept, corresponding to any one of the foregoing embodiment methods, the present disclosure further provides an electronic device, such as an extended reality device, including a memory, a processor, and a computer program stored on the memory and running on the processor. When the processor executes the program, the control method in any one of the foregoing embodiments is implemented.

Figure 9:
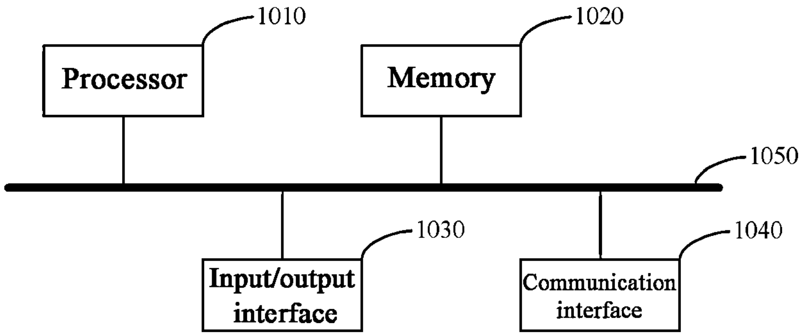
FIG. 9 is a structural schematic diagram of an electronic device according to an exemplary embodiment of the present disclosure.

FIG. 9 illustrates a more specific hardware structure schematic diagram of an electronic device according to an embodiment. The device may include: a processor 1010, a memory 1020, an input/output interface 1030, a communication interface 1040, and a bus 1050. The processor 1010, the memory 1020, the input/output interface 1030, and the communication interface 1040 are mutually in communication connection in the device through the bus 1050.

The processor 1010 may be implemented using methods, such as a general-purpose central processing unit (CPU), a microprocessor, an application specific integrated circuit (ASIC), or one or more integrated circuits, which is configured to execute relevant programs to implement the technical solutions provided in the embodiments of this specification.

The memory 1020 may be implemented using forms, such as a read only memory (ROM), a random access memory (RAM), a static storage device, and a dynamic storage device. The memory 1020 may store an operating system and other applications. When the technical solutions provided in the embodiments of this specification are implemented through software or firmware, relevant program code is stored in the memory 1020, and invoked and executed by the processor 1010.

The input/output interface 1030 is configured to be connected with an input/output module to achieve information input and output. The input/output module may be configured as a component in the device (not shown in the figure), and may also be externally connected to the device to provide corresponding functions. The input device may include a keyboard, a mouse, a touchscreen, a microphone, various sensors, etc. The output device may include a display, a speaker, a vibrator, an indicator light, etc.

The communication interface 1040 is configured to be connected with a communication module (not shown in the figure) to achieve communication interaction between the device and other devices. The communication module may communicate through a wired method (e.g., USB and a cable) or a wireless method (e.g., a mobile network, WIFI, and Bluetooth).

The bus 1050 includes a pathway for transmitting information between various components of the device (e.g., the processor 1010, the memory 1020, the input/output interface 1030, and the communication interface 1040).

It should be noted that although the above device only shows the processor 1010, the memory 1020, the input/output interface 1030, the communication interface 1040, and the bus 1050, in the specific implementation process, the device may also include other components necessary for normal operation. In addition, those skilled in the art should understand that the device may also only include components necessary for implementing the solutions of the embodiments of this specification, and does not necessarily include all the components shown in the figures.

The electronic device of the above embodiment is configured to implement the corresponding control method in any one of the foregoing embodiments, and has the beneficial effects of the corresponding method embodiment. Details are not repeated here.

Based on the same inventive concept, corresponding to any one of the foregoing embodiment methods, the present disclosure further provides a non-transitory computer-readable storage medium storing computer instructions. The computer instructions are configured to enable the computer to perform the control method in any one of the foregoing embodiments.

The computer-readable medium in this embodiment includes permanent and non-permanent, removable and non-removable media, which may implement information storage by any method or technology. Information may be computer-readable instructions, a data structure, a program module, or other data. Examples of the computer storage medium include, but are not limited to, a phase-change memory (PRAM), a static random access memory (SRAM), a dynamic random access memory (DRAM), another type of random access memory (RAM), a read only memory (ROM), an electrically erasable programmable read only memory (EEPROM), a flash memory or other memory technologies, a compact disc read only memory (CD-ROM), a digital versatile disc (DVD) or other optical storage, a magnetic cassette tape, a magnetic disk storage, or other magnetic storage devices, or any other non-transmission medium that may be configured to store information accessible to a computing device.

The computer instructions stored in the storage medium of the above embodiment are configured to enable the computer to perform the control method in any one of the foregoing embodiments, and has the beneficial effects of the corresponding method embodiment. Details are not repeated here.

Based on the same inventive concept, corresponding to the control method in any one of the foregoing embodiments, the present disclosure further provides a computer program product including computer program instructions. In some embodiments, the computer program instructions may be executed by one or more processors of a computer to enable the computer and/or the processor to perform the control. The processor that performs the corresponding steps may belong to a corresponding execution subject, corresponding to execution subjects of the various steps in the various embodiments of the control.

The computer program product in the above embodiment is configured to enable the computer and/or the processor to perform the control method in any one of the foregoing embodiments, and has the beneficial effects of the corresponding method embodiment. Details are not repeated here.

Those of ordinary skill in the art should understand that the discussion about any above embodiment is exemplary and is not intended to imply that the scope (including the claims) of the present disclosure is limited to these examples; and under the idea of the present disclosure, technical features in the foregoing embodiments or in different embodiments may also be combined, the steps may be implemented in any order, and many other variations of different aspects in the foregoing embodiments of the present disclosure may exist, and for brevity, are not provided in detail.

In addition, to simplify the description and discussion, and to avoid making the embodiments of the present disclosure difficult to understand, known power/ground connections to an integrated circuit (IC) chip and other components may or may not be shown in the provided accompanying drawings. Further, the apparatuses may be shown in the form of block diagrams to avoid making the embodiments of the present disclosure difficult to understand. The following fact is also considered, that is, the details of the implementation of the apparatuses in these block diagrams are highly dependent on a platform on which the embodiments of the present disclosure will be implemented (i.e., these details should be completely within the understanding scope of those skilled in the art). When the specific details (e.g., a circuit) are elaborated to describe the exemplary embodiments of the present disclosure, it is apparent to those skilled in the art that the embodiments of the present disclosure may be implemented without these specific details or with variations of these specific details. Therefore, these descriptions should be considered illustrative rather than restrictive.

Although the present disclosure has been described in conjunction with the specific embodiments of the present disclosure, many substitutions, modifications, and variations of these embodiments are apparent to those of ordinary skill in the art according to the foregoing descriptions. For example, other memory architectures (e.g., a dynamic RAM (DRAM)) May use the discussed embodiments.

The embodiments of the present disclosure are intended to cover all such substitutions, modifications, and variations that fall within the broad scope of the appended claims. Therefore, any omissions, modifications, equivalent substitutions, improvements, etc., made within the spirit and principle of the embodiments of the present disclosure should fall within the scope of protection of the present disclosure.

We claim:

1. A backlight control system, comprising:

a power conversion unit, configured to convert an input electrical signal into an output voltage to drive a light source, wherein the light source is a light-emitting diode (LED);

an acquisition unit, configured to acquire a cathode voltage of the light source at a timing of a completion of light source illumination;

a processing unit, connected to the acquisition unit and configured to determine feedback information used to adjust the output voltage based on a preset voltage and the cathode voltage; and a constant current control unit, connected between the LED and ground, and configured to perform constant current control on the LED, wherein the constant current control unit comprises:

a transistor, wherein a collector of the transistor is connected to a cathode of the LED;

a first resistor, wherein an emitter of the transistor is connected to the ground via the first resistor;

an amplifier, wherein an input terminal of the amplifier is used to receive a reference voltage, another input terminal of the amplifier is connected to the emitter of the transistor, and an output terminal of the amplifier is connected to a base of the transistor; and a second resistor, connected between the output terminal of the amplifier and the base of the transistor.

2. The backlight control system according to claim 1, wherein the power conversion unit is a voltage stabilization output device.

3. The backlight control system according to claim 1, wherein the preset voltage is determined according to a voltage drop across the transistor and the first resistor under a constant current condition.

4. The backlight control system according to claim 1, wherein the acquisition unit comprises:

a diode, wherein a cathode of the diode is connected to the cathode of the LED, and an anode of the diode is connected to the processing unit; and a bias module connected to the anode of the diode.

5. The backlight control system according to claim 4, wherein there are a plurality of LEDs forming at least two channels;

a number of diodes corresponds to a number of channels of the LEDs; and the bias module is connected to anodes of respective diodes.

6. The backlight control system according to claim 4, wherein the bias module comprises:

a third resistor, wherein a terminal of the third resistor is connected to the anode of the diode, and another terminal of the third resistor is used to receive a bias voltage.

7. The backlight control system according to claim 6, wherein the bias voltage is greater than the preset voltage.

8. The backlight control system according to claim 6, wherein a resistance value of the third resistor is 0.09 MΩ to 1.1 MΩ.

9. A control method for a power conversion unit, wherein the control method is applied to a backlight control system, comprising:

in response to a completion of illumination of a light source of a backlight system, acquiring a cathode voltage of the light source; and determining feedback information used to adjust an output voltage of the power conversion unit based on a preset voltage and the cathode voltage, wherein the output voltage is used to drive the light source, wherein determining feedback information used to adjust an output voltage of the power conversion unit based on the preset voltage and the cathode voltage comprising:

calculating deviation information between the preset voltage and the cathode voltage; and determining the feedback information according to the deviation information, wherein the deviation information is difference information, and wherein determining the feedback information according to the deviation information comprising:

the feedback information comprises information indicating reducing an amplitude of the output voltage, in response to a difference between the cathode voltage and the preset voltage being greater than zero; and the feedback information comprises information indicating increasing the amplitude of the output voltage, in response to the difference between the cathode voltage and the preset voltage being less than zero.

10. The control method according to claim 9, further comprising:

determining the completion of illumination of the light source of the backlight system, comprising:

acquiring a pulse width adjustment signal; and determining a time range for the completion of illumination of the light source based on a preset time threshold and the pulse width adjustment signal.

11. An electronic device, comprising a memory, a processor, and a computer program stored in the memory and running on the processor, wherein the computer program, when executed by the processor, causes the electronic device to perform steps of:

in response to a completion of illumination of a light source of a backlight system, acquiring a cathode voltage of the light source; and determining feedback information used to adjust an output voltage of the power conversion unit based on the preset voltage and the cathode voltage, wherein the output voltage is used to drive the light source, wherein the step of determining feedback information used to adjust an output voltage of the power conversion unit based on the preset voltage and the cathode voltage comprising:

calculating deviation information between the preset voltage and the cathode voltage; and determining the feedback information according to the deviation information, wherein the deviation information is difference information, and wherein the step of determining the feedback information according to the deviation information comprising:

the feedback information comprises information indicating reducing an amplitude of the output voltage, in response to a difference between the cathode voltage and the preset voltage being greater than zero; and the feedback information comprises information indicating increasing the amplitude of the output voltage, in response to the difference between the cathode voltage and the preset voltage being less than zero.

12. The electronic device of claim 11, wherein the computer program, when executed by the processor, causes the electronic device to perform steps of:

determining the completion of illumination of the light source of the backlight system, comprising:

acquiring a pulse width adjustment signal; and determining a time range for the completion of illumination of the light source based on a preset time threshold and the pulse width adjustment signal.

13. The electronic device according to claim 11, wherein the deviation information is proportion information; and wherein the step of determining feedback information used to adjust an output voltage of the power conversion unit comprising:

the feedback information comprises information indicating reducing an amplitude of the output voltage, in response to a ratio of the cathode voltage to the present voltage being greater than one; and the feedback information comprises information indicating increasing the amplitude of the output voltage, in response to a ratio of the cathode voltage to the present voltage being less than one.

14. The electronic device of claim 11, wherein the light source is a light-emitting diode (LED).

* * * * *